United States Patent Office 3,652,488
Patented Mar. 28, 1972

3,652,488
FLAME RESISTANT SILICONE ELASTOMERS CONTAINING CARBON BLACK AND PLATINUM
James W. Harder, Midland, Mich., assignor to Dow Corning Corporation, Midland, Mich.
No Drawing. Filed July 16, 1969, Ser. No. 842,396
Int. Cl. C08g 51/04
U.S. Cl. 260—37 SB  16 Claims

ABSTRACT OF THE DISCLOSURE

A flame resistant silicone elestomer stock having improved flame resistance cures to a flame resistant silicone elastomer. The silicone elastomer stock contains 100 parts by weight of a silicone polymer free of silicon bonded hydrogen atoms, 10 to 100 parts by weight of a reinforcing silica filler, 10 to 150 parts per million by weight based on the weight of the silicone polymer of platinum and 0.05 to 2 parts by weight of carbon black essentially free of sulfur.

---

This invention relates to an improved flame resistant silicone elastomer composition.

Flame resistant materials are always desirable and the search for these materials is a continuous process. Because fires are so destructive, people desire to protect themselves and their property by using materials which are flame resistant. Electrical devices are often the cause of fires and it is therefore important to provide electrical devices with as much protection as possible. Furthermore, it is important that electrical devices and wiring remain operative even after being exposed to flames, particularly in aircraft and ships where failure could cause disaster. For this reason flame resistant insulation is highly desirable.

An object of the present invention is to provide a silicone elastomer which has improved flame resistance over the flame resistant silicone elastomer containing the flame resistant additive, platinum. Other objects and advantages will become apparent from the following detailed description.

It is known in the silicon rubber art that carbon black can be added to silicone rubber as a pigment and filler. It is, however, completely unexpected that a combination of small amounts of carbon black and platinum will provide an improved flame resistance silicone elastomer. Since small amounts of carbon black do not improve the flame resistance of a silicone elastomer, it would not be predictable that any advantage could be achieved from a combination of the carbon black and platinum in silicone elastomers.

The present invention relates to a flame resistant silicone elastomer stock consisting essentially of:

(A) 100 parts by weight of a polydiorganosiloxane gum wherein each organic group is selected from the group consisting of a methyl radical, a vinyl radical and a phenyl radical, there being from 0 to 2.0 inclusive percent vinyl radicals based on the total number of organic radicals in the polydiorganosiloxane gum, there being from 0 to 10 inclusive percent phenyl radicals based on the total number of organic radicals in the polydiorganosiloxane gum and there being from 1.98 to 2.002 organic radicals per silicon atom in the polydiorganosiloxane gum, (B) From 10 to 100 inclusive parts by weight of a reinforcing silica filler, (C) From 0.1 to 10 inclusive parts by weight of an organic peroxide, (D) From 10 to 150 inclusive parts by weight platinum per million parts by weight polydiorganosiloxane gum, said platinum being in the form of a platinum containing material in an unsupported form, and (E) From 0.05 to 2 parts by weight of carbon black being essentially free of sulfur, said flame resistant composition being free of silicon bonded hydrogen atoms.

The silicone elastomer stocks of the present invention can be any conventional silicone elastomer stock based on a polydiorganosiloxane gum which contains methyl and/or vinyl, and phenyl radicals bonded to the silicone atoms of the polydiorganosiloxane gum used therein. The polydiorganosiloxane gums are well known in the art and can be obtained commercially. Examples of polydiorganosiloxane gums are those polymers, copolymers and mixtures thereof wherein the repeating units are represented by dimethylsiloxane, phenylmethylsiloxane, diphenylsiloxane, methylvinylsiloxane and phenylvinylsiloxane units. The polydiorganosiloxane gums can contain vinyl radicals up to 2 percent of the total number of organic radicals, preferably up to 1 percent, and phenyl radicals up to 10 percent of the total number of organic radicals, preferably up to 5 percent. The polydiorganosiloxane gums can have an average of 1.98 to 2.002 silicon bonded organic radicals per silicon atom. The terminating units can be triorganosiloxy units, hydroxyl groups or alkoxy groups. The triorganosiloxy units can be illustrated by trimethylsiloxy, dimethylvinylsiloxy, methylphenylvinylsiloxy, methyldiphenylsiloxy, and the like.

The silicone elastomer stocks of the present invention can contain any of the conventional reinforcing silica fillers. These reinforcing silica fillers are well known in the art and can be obtained commercially. The reinforcing silica fillers can be untreated, treated or treated in situ. The treated reinforcing silica fillers can be treated by any of the conventional methods described in the prior art, wherein the treating agents include, organosilanes, organosiloxane, and silazanes. The amount of reinforcing silica filler can be from 10 to 100 parts by weight per 100 parts by weight of the polydiorganosiloxane gum, preferably from 20 to 60 parts by weight reinforcing silica filler.

The organic peroxide can be any of the conventional organic peroxides used to vulcanize silicone rubber. Some illustrative examples of organic peroxides include, bis-(2,4-dichlorobenzoyl) peroxide, benzoyl peroxide, dicumyl peroxide, paradichlorobenzoyl peroxide, tertiary butyl perbenzoate, 2,5-bis(tertiary butyl peroxy)-2,5-dimethylhexane, and ditertiary butyl peroxide. The organic peroxides can be present in amounts of from 0.1 to 10 parts by weight per 100 parts by weight of the polydiorganosiloxane gum, preferably from 0.4 to 5 parts by weight.

The platinum is present in an amount of from 10 to 150 parts by weight per million parts by weight polydiorganosiloxane gum. The preferred amount of platinum is from 20 to 80 parts by weight per million parts by weight polydiorganosiloxane gum. The platinum can be added in any unsupported form that will permit essentially homogeneous dispersion. A supported form of platinum is platinum metal precipitated on a substrate such as silica, carbon or alumina. Therefore, platinum in an unsupported form is any platinum containing material which is not platinum metal precipitated on a substrate. Included in the platinum containing materials are the readily dispersable platinum compounds and complexes which are well known in the art. Illustrative of the readily dispersable platinum containing materials include, chloroplatinic acid, platinum chlorides,

platinum bromides, a complex of platinus halide and an olefin such as ethylene, propylene, butylene, cyclohexane and styrene, Pt(CH$_3$CN)$_2$Cl$_2$,
[Pt(CH$_3$CN)$_2$(NH$_3$)$_4$]Cl$_2$,
Pt(NH$_3$)$_2$Cl$_2$,
K[PtCl$_3$(CH$_2$CH$_2$CH$_2$OH)],
PtBr$_2$(C$_2$H$_4$)$_2$,
K[PtBr$_3$(C$_2$H$_4$)],
PtCl$_2$(C$_2$H$_4$),
(CH$_3$)$_2$C=CH$_2$·PtCl$_2$,
H$_2$Pt(CN)$_4$·5H$_2$O,
H[PtCl$_3$(CH$_3$CN)],
Pt(NH$_3$)$_2$(CNS)$_2$,
[Pt(NH$_3$)$_4$]·[PtCl$_4$],
PtCl$_2$[P(CH$_2$CH$_3$)$_3$]$_2$,
PtCl$_2$·PCl$_3$,
PtCl$_2$·P(OH)$_3$,
PtCl$_2$·P(OCH$_2$CH$_3$)$_3$,
PtCl$_2$·[P(OCH$_2$CH$_3$)$_3$]$_2$,
Pt(OOCCH$_2$SCH$_2$CH$_3$)$_2$,
Pt(CN)$_3$,
(CH$_3$)$_4$Pt,
(CH$_3$)$_3$Pt—Pt(CH$_3$)$_3$,

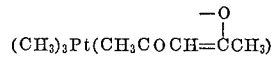

PtCl$_2$CO and PtBr$_2$CO.

The platinum can be added to any of the silicone elastomer socks, either during their formulation or to a stock already formulated. The platinum should be thoroughly mixed to form a homogeneous mixture. Conventional formulating techniques can be used, such as milling. For better and faster dispersion of the platinum, organic solvents can be used. Organic solvents ordinarly used in preparing silicone elastomer stocks are suitable, such as isopropanol, ethanol, benzene, toluene and xylene.

The ingredient of the present invention which unexpectedly provides the improved flame resistant properties is the carbon black which is essentially free of sulfur. By the term "essentially free of sulfur," it is to be understood that the carbon black contains either no sulfur or very low amounts of sulfur which by its presence will not effect the flame resistant property of the silicone elastomer. Any of the carbon blacks which are available commercially or equivalents thereof can be used as long as the sulfur content is very low. Such carbon blacks can be illustrated by lamp black, furnace black, bone black, acetylene black and the like.

The carbon black is present in the silicone elastomer stock in an amount of from 0.05 to 2 parts by weight per 100 parts by weight of the polydiorganosiloxane gum. Preferably, the carbon black is present in an amount of 0.1 to 0.8 part by weight per 100 parts by weight of the polydiorganosiloxane gum.

The flame resistant silicone elastomer stock of the present invention can be prepared in any conventional manner known in the art, such as by milling. The addition of the carbon black is not critical, however, the best means of mixing the carbon black into the silicone elastomer stock is to mill it with the base silicone polymer at the time the filler is added. Alternatively the carbon black can be first mixed with a small amount of the polydiorganosiloxane gum or a lower molecular weight polydiorganosiloxane and then added to the remaining portion of the polydiorganosiloxane gum. The best means for obtaining a homogeneous mixture is desirable.

The flame resistant silicone elastomer stocks of the present invention can include other fillers such as finely divided quartz, clays, calcium carbonate, diatomaceous earth, titanium dioxide, iron oxide and others which are conventionally used in silicone elastomers. Other additives such as heat stability additives, antioxidants, processing aids and other additives conventionally used in silicone elastomers can be used in the flame resistant silicone elastomer stock of this invention. Those skilled in the art of silicone rubber wanting to include some of the conventional ingredients other than those specifically stated in the composition should determine the flame resistance of the stock by the test described herein. Some ingredients may be sufficiently combustible to destroy the flame resistant property or they may be catalytic in nature and promote combustion, thereby destroying the flame resistant property.

The flame resistant composition of the present invention provides a much improved flame resistant silicone elastomer. The prior art flame resistant silicone elastomers are more flame resistant than the same silicone elastomers without the flame resistant additives, but they fail to pass serve flame tests and also fail under use conditions which require a highly flame resistant material.

The flame resistant silicone elastomer stocks of the present invention can be cured by heating the stocks to produce silicone elastomers which are flame resistant and which have useful elastomeric properties. It has been found that the flame resistance of a cured silicone elastomer is dependent upon the moisture content of the cured silicone elastomer. The flame resistance of cured silicone elastomer decreases with increasing moisture content. Thus, whereas a silicone rubber may be flame resistant at 0% moisture, it may not be flame resistant after being exposed to 50%, 60% or 100% relative humidity, whereby the moisture content of the silicone rubber is increased. The explanation for this phenomenon is not known to the inventor, however, the present invention overcomes this dependency of the flame resistance upon the moisture content of the silicone rubber. The use of platinum alone as a flame retardant additive will not provide a flame resistant silicone elastomer at all moisture contents.

The unique combination of ingredients of the present invention provides a flame resistant silicone elastomer which has improved flame resistance over the use of platinum alone and also provides a flame resistant silicone elastomer which does not lose much of its flame resistance when the moisture content is increased.

The combination of carbon black and platinum provides a silicone elastomer which has flame resistant properties and which can also be vulcanized with any of the organic peroxides. Since small amounts of carbon black are used, the flame resistant silicone elastomer stocks can be pigmented a variety of colors, however, some limitations are observed because of the high pigmenting power of even small amounts of carbon black.

The following examples are illustrative only and should not be construed as limiting the present invention which is properly delineated in the appended claims.

EXAMPLE 1

A silicone elastomer stock was prepared by milling a mixture of 100 parts by weight of a polydiorganosiloxane gum having 98.876 percent methyl radicals, 0.359 percent vinyl radicals and 0.765 percent phenyl radicals, 50.46 parts by weight treated reinforcing silica, 2.03 parts by weight of a heat stability additive, 15.27 parts by weight 5 micron quartz, 43.5 parts by weight platinum per million parts by weight polydiorganosiloxane gum added as one weight percent solution of chloroplatinic acid in isopropanol and 1.374 parts by weight 2,4-dichlorobenzoyl peroxide. Some carbon black was added to a portion of the silicone elastomer stock. The portion containing the carbon black and the remaining portion were then press molded for 5 minutes at 116° C. and then post cured for 4 hours at 163° C. to provide the test specimens. The test specimens were then moisture conditioned as described in Table I. The moisture conditioned test speciments were then tested for flame resistance by exposing a 0.075 inch thick test specimen to an open yellow flame 1.5 inches in height from a ⅜ inch I.D. Bunsen burner. The end of the test specimen was held 0.75 inch from the top of the burner for a period of 12 seconds. The test specimen was then removed and the burn time was observed. The burn time was recorded as length of time, in seconds, between the removal of the test specimen from the flame to the last evidence of flame and glow of the test specimen. The char length was measured and recorded in inches.

TABLE I

| Test Specimen No. | Carbon black, parts by weight | Moisture conditioning | Burn time, seconds | Char length, inches |
| --- | --- | --- | --- | --- |
| 1 | 0 | 24 hrs. at 50% humidity | 38.1 | 0.250 |
| 2 | 1.07 | do | 1.6 | 0.03125 |
| 3 | 0 | 0.5 hr. at 20 lbs. steam | 81.0 | 0.8125 |
| 4 | 1.07 | do | 1.0 | 0.03125 |
| 5 | 1.07 | 0.5 hr. at 20 lbs. steam plus 16 hrs. at 50% humidity. | 4.6 | 0.03125 |

EXAMPLE 2

Silicone elastomer stocks were prepared as described in Example 1 except for the amount and type of peroxide used. In test specimens No. 1 through 10 the amount of 5 micron quartz was 7.64 parts by weight instead of 15.27 parts by weight. This example showed that improved flame resistance was obtained regardless of the type of peroxide used to cure the silicone elastomer stock when a combination of platinum and carbon black was used. Each test specimen was obtained by press molding according to the following schedule shown in Table II.

TABLE II

| Peroxide | Time, minutes | Temp., ° C. |
| --- | --- | --- |
| 2,4-dichlorobenzoyl peroxide | 5 | 116 |
| Benzoyl peroxide | 5 | 127 |
| 2,5-bis(tertiary butyl peroxy)-2,5-dimethylhexane | 10 | 171 |
| Dicumyl peroxide | 10 | 150 |
| Tertiary butyl perbenzoate | 10 | 150 |

All the specimens were post cured for 4 hours at 163° C. The 12 second flame test described in Example 1 was used to determine the flame resistance. The burn time and char length were recorded and are shown in Table III. The test specimens tested at 0 percent humidity were flame tested immediately upon removal from the post cure oven. The test specimens tested at 50 percent humidity were flame tested after conditioning at 50 percent humidity for 24 hours.

(A)

100 parts of polydimethylsiloxane gum having 2.002 methyl radicals per silicon atom,
60 parts of a treated reinforcing silica,
10 parts of benzoyl peroxide,
10 parts per million of platinum in the form of $PtCl_2 \cdot PCl_3$, and
0.05 part carbon black (B)

100 parts of a polydiorganosiloxane gum having 1.98 organic radicals per silicon atom where the organic radicals are 99 percent methyl radicals, and 1 percent vinyl radicals,
40 parts of a reinforcing silica
1.0 part of 2,4-dichlorobenzoyl peroxide
20.0 parts per million platinum in the form of $PtCl_2 \cdot [P(OCH_2CH_3)_3]_2$ and
0.10 part carbon black (C)

100 parts of a polydiorganosiloxane gum having 93 percent methyl radicals, 5 percent phenyl radicals and 2 percent vinyl radicals and 2.001 organic radicals per silicon atom,
100 parts of a treated reinforcing silica filler
2 parts dicumyl peroxide
2 parts carbon black
150 parts per million of platinum in the form of $PtBr_2(C_2H_4)_2$.

(D)

100 parts of a polydiorganosiloxane gum having 89.5 percent methyl radicals, 0.5 percent vinyl radicals and 10 percent phenyl radicals and hydroxyl endblocked,
50 parts of a reinforcing silica filler,
60 parts per million of platinum in the form of $H_2Pt(CN)_4 \cdot 5H_2O$,
0.8 part carbon black, and
0.1 part of 2,5-bis(tertiary butyl peroxy)-2,5-dimethylhexane.

That which is claimed is:
1. A flame resistant composition consisting essentially of
(A) 100 parts by weight of a polydiorganosiloxane gum wherein each organic group is selected from the group consisting of a methyl radical, a vinyl radical

TABLE III

| Test Specimen No. | Peroxide catalyst | Amount peroxide, parts by weight | Carbon black, parts by weight | Humidity, percent | Burn time, seconds | Char length, inches |
| --- | --- | --- | --- | --- | --- | --- |
| 1 [1] | 2,4-dichlorobenzoyl peroxide | 1.22 | 0 | 0 | 12 | 0.0625 |
| 2 [1] | Benzoyl peroxide | 0.69 | 0 | 0 | 63 | 0.625 |
| 3 [1] | 2,5-(tert, butyl peroxy)-2,5-dimethylhexane | 0.46 | 0 | 0 | 99 | 1.375 |
| 4 [1] | Dicumyl peroxide | 1.22 | 0 | 0 | 63 | 0.875 |
| 5 [1] | 2,4-dichlorobenzoyl peroxide | 1.22 | 0 | 50 | 69 | 0.500 |
| 6 [1] | Benzoyl peroxide | 0.69 | 0 | 50 | 98 | 1.125 |
| 7 [1] | 2,5-bis(tert, butyl peroxy)-2,5-dimethylhexane | 0.46 | 0 | 50 | Burned | [2] |
| 8 [1] | Dicumyl peroxide | 1.22 | 0 | 50 | 82 | 1.2505 |
| 9 | 2,4-dichlorobenzoyl peroxide | 1.22 | 0.08 | 0 | 2.6 | 0.0312 |
| 10 | do | 1.22 | 0.08 | 50 | 7.0 | 0.0312 |
| 11 | do | 1.37 | 1.07 | 50 | 1.6 | 0.0312 |
| 12 | Benzoyl peroxide | 0.69 | 1.07 | 50 | 52.5 | 0.250 |
| 13 | 2,5-(tert, butyl peroxy)-2,5-dimethylhexane | 0.46 | 1.07 | 50 | 1.5 | 0.03125 |
| 14 | Dicumyl peroxide | 1.22 | 1.07 | 50 | 2.5 | 0.03125 |
| 15 | Tertiary butyl perbenzoate | 0.46 | 1.07 | 50 | 6.0 | 0.03125 |
| 16 | 2,4-dichlorobenzoyl peroxide | 1.37 | [3] 1.07 | 0 | 2.6 | 0.03125 |
| 17 | do | 1.37 | [4] 1.07 | 0 | 0.3 | 0.03125 |

[1] For comparative purposes,
[2] Totally consumed,
[3] Carbon black, P-33,
[4] Carbon black, Shawinigan Black,

EXAMPLE 3

When the following silicone elastomer stocks are prepared and cured, the test specimens show improved flame resistance as indicated by the burn time and char length observed from the 12 second flame test described in Example 1 as compared to the same composition without the carbon black. Parts are parts by weight.

and a phenyl radical, there being from 0 to 2.0 inclusive percent vinyl radicals based on the total number of organic radicals in the polydiorganosiloxane gum and there being from 1.98 to 2.002 organic radicals per silicon atom in the diorganosiloxane gum,
(B) from 10 to 100 inclusive parts by weight of a reinforcing silica filler, (C) from 0.1 to 10 inclusive parts by weight of an organic peroxide, (D) from 10 to 150 inclusive parts by weight platinum per million parts by weight polydiorganosiloxane gum, said platinum being in the form of a platinum containing material in an unsupported form, and (E) from 0.05 to 2 parts by weight of carbon black being essentially free of sulfur, said flame resistant composition being free of silicon bonded hydrogen atoms.

2. The flame resistant silicone elastomer stock of claim 1 wherein the reinforcing silica filler (B) is present in an amount of from 20 to 60 inclusive parts by weight, the organic peroxide (C) is present in an amount of from 0.4 to 5 inclusive parts by weight and the platinum (D) is present in an amount of from 20 to 80 inclusive parts by weight per million parts by weight of the polydiorganosiloxane gum.

3. The flame resistant silicone elastomer stock of claim 1 wherein the carbon black is present in an amount of from 0.1 to 0.8 inclusive parts by weight.

4. The flame resistant silicone elastomer stock of claim 2 wherein the carbon black is present in an amount of from 0.1 to 0.8 inclusive parts by weight.

5. The flame resistant silicone elastomer stock of claim 1 wherein the platinum is in the form of chloroplatinic acid.

6. The flame resistant silicone elastomer stock of claim 2 wherein the platinum is in the form of chloroplatinic acid.

7. The flame resistant silicone elastomer stock of claim 3 wherein the platinum is in the form of chloroplatinic acid.

8. The flame resistant silicone elastomer stock of claim 4 wherein the platinum is in the form of chloroplatinic acid.

9. A cured flame resistant silicone elastomer produced by curing the flame resistant silicone elastomer stock of claim 1.

10. A cured flame resistant silicone elastomer produced by curing the flame resistant silicone elastomer stock of claim 2.

11. A cured flame resistant silicone elastomer produced by curing the flame resistant silicone elastomer stock of claim 3.

12. A cured flame resistant silicone elastomer produced by curing the flame resistant silicone elastomer stock of claim 4.

13. A cured flame resistant silicone elastomer produced by curing the flame resistant silicone elastomer stock of claim 5.

14. A cured flame resistant silicone elastomer produced by curing the flame resistant silicone elastomer stock of claim 6.

15. A cured flame resistant silicone elastomer produced by curing the flame resistant silicone elastomer stock of claim 7.

16. A cured flame resistant silicone elastomer produced by curing the flame resistant silicone elastomer stock of claim 8.

References Cited

UNITED STATES PATENTS

| 2,637,711 | 5/1953 | Auer | 106—307 |
|---|---|---|---|
| 2,707,672 | 5/1955 | Sweitzer | 106—307 |
| 3,222,202 | 12/1965 | Jordan et al. | 106—307 |
| 3,514,424 | 5/1970 | Noble et al. | 260—37 SB |

OTHER REFERENCES

Fordham: Silicones; George Newnes Limited; 1960; pp. 161–163 and 167; Sci. Lib., TP 248.S5 F6.

LEWIS T. JACOBS, Primary Examiner

U.S. Cl. X.R.

260—DIG 24